US006839610B2

(12) United States Patent
Carstens et al.

(10) Patent No.: US 6,839,610 B2
(45) Date of Patent: Jan. 4, 2005

(54) RETROFIT AUDIT SYSTEM

(75) Inventors: Jeffrey M. Carstens, West Chester, PA (US); Robert D. Ross, Gibbsboro, NJ (US); Gordon Genoff, Chesapeake, VA (US)

(73) Assignee: Mars Incorporated, McLean, VA (US)

( * ) Notice: Subject to any disclaimer, the term of this patent is extended or adjusted under 35 U.S.C. 154(b) by 7 days.

(21) Appl. No.: 10/277,473

(22) Filed: Oct. 22, 2002

(65) Prior Publication Data

US 2003/0158625 A1 Aug. 21, 2003

Related U.S. Application Data

(60) Provisional application No. 60/348,784, filed on Oct. 23, 2001.

(51) Int. Cl.[7] .......... G06F 17/00

(52) U.S. Cl. .......... 700/236; 700/241; 700/244

(58) Field of Search .......... 700/231, 236, 700/241, 244

(56) References Cited

U.S. PATENT DOCUMENTS

| | | | | |
|---|---|---|---|---|
| 5,299,113 A | * | 3/1994 | England et al. | 700/17 |
| 5,924,081 A | * | 7/1999 | Ostendorf et al. | 700/236 |
| 5,959,869 A | * | 9/1999 | Miller et al. | 700/231 |
| 6,339,731 B1 | * | 1/2002 | Morris et al. | 700/236 |
| 6,457,038 B1 | * | 9/2002 | Defosse | 700/244 |
| 6,505,095 B1 | | 1/2003 | Kolls | |

FOREIGN PATENT DOCUMENTS

| | | |
|---|---|---|
| EP | 0 986 033 A2 | 3/2000 |
| WO | WO 00/33554 | 6/2000 |

* cited by examiner

*Primary Examiner*—Gene O. Crawford
(74) *Attorney, Agent, or Firm*—Fish & Richardson P.C.

(57) ABSTRACT

An audit system for connection to vending machines is described. In an implementation, the audit system includes an audit monitor containing a microprocessor capable of reading information from at least one of a vending machine or from an operational device. The audit system also includes at least one sub-module coupled to the audit monitor and capable of detecting additional information.

29 Claims, 6 Drawing Sheets

RETROFIT AUDIT SYSTEM

This application claims priority from U.S. Provisional Application No. 60/348,784 filed on Oct. 23, 2001.

BACKGROUND OF THE INVENTION

The invention pertains to a retrofit audit system for reading information from a target vending machine or operational device. Such a retrofit audit system includes a master module and at least one sub-module for detecting further information.

The current standard for vending machines control boards is to provide complete accountability for all cash and non-cash transactions, products delivered, and any errors or other machine based changes that may have occurred either during a vending cycle or when the machine is serviced by operating personnel. The method for doing this is known, and the means to retrieve the accountability information (hereto referred to as audit data) is governed by defined vending industry standards supported by the National Automatic Merchandising Association (NAMA) and the European Vending Association (EVA). A complete specification titled the *European Vending Association Data Transfer Standard* (EVA-DTS) exists which documents the different protocols used to transfer audit data to collection devices and the precise composition and format of that data.

In contrast to modern machines, early vending machines (those produced approximately from the 1960's to the 1980's) had no means to collect audit data and/or to transmit such data to an MIS system via a defined protocol. Thus, it would be beneficial to provide a device to retrofit to the early vending machines so as to offer such features.

SUMMARY OF THE INVENTION

Provided is a retrofit audit system implemented by a collection of devices that will monitor the various cash transactions and product vending cycles in existing vending machines, store this information in non-volatile memory, and provide for the transmission of that data to a transfer device or terminal. The system will also monitor various vending machine parameters with the intent of detecting abnormal or service type conditions.

In an implementation, the retrofit audit system includes a master module containing a microprocessor capable of reading information directly from a target vending machine control system or operational device. The master module includes at least one communication port. In addition, a plurality of sub-modules are connected to the communication port of the master module. The sub-modules are capable of detecting additional information from the target vending machine or operational device.

The retrofit audit system may include one or more of the following features. At least one sub-module contains a microprocessor. The sub-modules may include at least one of a linear motor monitor, a matrix motor monitor, a direct linear motor monitor and a direct matrix motor monitor. The direct linear motor monitor and the direct matrix motor monitor may include shift registers, wherein two direct linear motor monitors and/or two direct matrix motor monitors can be daisy chained together. The microprocessor may be able to read DEX/UCS based audit data, or DDCMP based audit data, or Printer based audit data, from the target vending machine control system or operational device and combine that information with additional information directly monitored from the target vending machine. The microprocessor may be able to correlate and transform the retrieved DDCMP and printer based audit data from the target vending machine control system or operational device into the current vending industry standard data format. The microprocessor may be able to correlate and transform the information directly monitored from the target vending machine into the current vending industry standard data format. The microprocessor may be able to transmit the collected and transformed data via the current vending industry standard protocols and data formats. The apparatus may include an illuminated DEX/UCS audit port socket. The microprocessor may be configured for the target vending machine via specialized commands and configuration messages. At least one sub-module may contain circuitry to detect when monitored AC signals are in the portion of the cycle when they are valid.

In another implementation, an audit system includes an audit module containing a microprocessor and a plurality of input interface components operable to read information from at least one of a vending machine control system and an operational device. The audit module also includes a plurality of output components. In addition, at least one motor sub-module is coupled to the audit module for monitoring vending machine motors.

This implementation may include one or more of the following features. The motor sub-module may be at least one of a linear motor monitor, a matrix motor monitor, a direct linear motor monitor, and a direct matrix motor monitor. The direct linear motor monitor and the direct matrix motor monitor may include shift registers, such that at least two direct linear motor monitors or at least two direct matrix motor monitors can be connected together in a daisy-chain configuration. The audit module may include a DEX/UCS interface for reading DEX/UCS based audit data and may combine that information with additional information from a vending machine, the DEX/UCS interface may be a socket, and the audit module may include a light means that illuminates the socket. The audit module may read DDCMP based audit data, or printer-based data, and combine that information with additional information from a vending machine. The microprocessor may correlate and transform the DDCMP audit data, or the printer-based audit data, into vending industry standard data format. The microprocessor may correlate and transform data collected from a vending machine into vending machine industry standard data format. The microprocessor may transmit data collected from a vending machine via vending industry standard protocols and data format. The direct linear motor module may include circuitry to detect when monitored AC signals are valid, and the monitored AC signals may include at least one of motor signals, credit signals and cash counter signals. The audit system may include a user button.

Although numerous types of vending machines can be monitored, in an implementation the audit output of the Retrofit Audit System adheres to the *European Vending Association Data Transfer Standard* (EVA-DTS). This standard defines the means by which data is formatted and the protocols by which the data can be extracted. Two protocols are currently defined and supported by an implementation of the Retrofit Audit System, the DEX/UCS and the Enhanced DDCMP (Optical) Protocol. The Retrofit Audit System therefore advantageously provides a system for collecting audit data and for transmitting such data to an MIS system via a predefined protocol, and provides a system that can be conveniently retrofitted to a plurality of vending machines, even to vending machines manufactured in the 1960's to 1980's.

The details of one or more embodiments of the invention are set forth in the accompanying drawings and the description below. Other features and advantages of the invention will be apparent from the description and drawings, and from the claims.

BRIEF DESCRIPTION OF THE DRAWINGS

Like reference symbols in the various drawings indicate like elements.

DETAILED DESCRIPTION

A wide variety of older vending machines exist with an equally wide variety of unique vending interfaces, and thus the retrofit audit system incorporates a number of modules with which to monitor the cash transactions and product vending cycles. In an implementation, a complete Retrofit Audit System may include an Audit Monitor Controller, a Linear Motor Monitor, a Matrix Motor Monitor, a Direct Linear Motor Monitor, a Direct Matrix Motor Monitor, an Optical Isolator Module and connection cables. A configuration of a Retrofit Audit System may include, for example, an Audit Monitor Controller, one or more Direct Linear Motor Monitors, an Optical Isolator Module and connection cables. Other configurations are possible because the system can be configured to meet specific and/or varying specifications depending on, for example, vending machine type.

Figure 1:
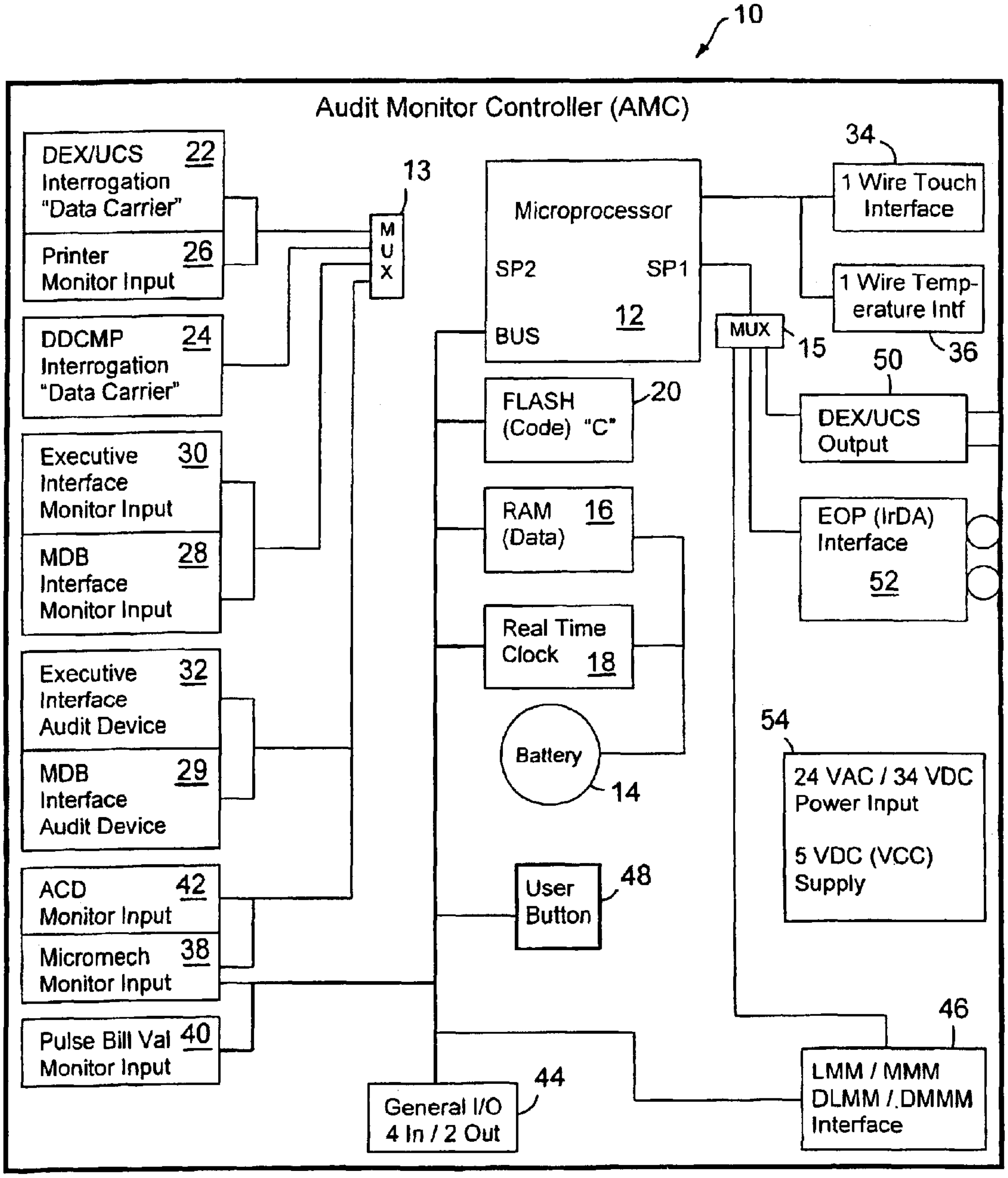
FIG. 1 is a simplified block diagram of an Audit Monitor Controller (AMC).

FIG. 1 is a simplified block diagram of an Audit Monitor Controller (AMC) 10. The Audit Monitor Controller is a hardware/software device which interfaces to a vending machine directly and/or to various motor monitoring submodules which will be described in detail below. The AMC incorporates a microcontroller 12 connected to various input and output components through multiplexers 13 and 15, or directly as described below. The AMC includes battery 14 connected to back up memory 16 and a real time clock 18. The operating firmware resides in FLASH memory 20 for ease of field enhancements via a boot loader. The primary inputs and outputs of the AMC are described below.

The DEX/UCS interface 22 is a hardwired input interface used by data carriers to extract audit information from vending machines. DEX systems typically operate at 9600 baud on either 0 to 5 volt or standard RS232 levels. The AMC connects to the existing vending machine controller via an electronically switchable direct DEX connection. It acts as a "data carrier" and interrogates the Vending Machine Controller (VMC) of a vending machine to extract the machine's audit data. It also is able to send configuration or command information to the VMC. Although the AMC normally takes the role as a MASTER during the first DEX handshake, it can be optionally configured to act as a SLAVE if required for older vending machine controllers.

The DDCMP interface 24 is an optical interface used by data carriers to extract audit information from vending machines. Initially, DDCMP based systems operated at 1200 baud; however, newer machines use 2400 baud. The AMC connects to the existing vending machine controller via a direct hardware connection. It acts as a "data carrier" and interrogates the VMC to extract the machine's audit data. Older vending machines implemented a unique means of packetizing the audit data (lists). More recent vending machines implement the DEX type data elements. Although initial connections are typically hardwired, the use of an external optical interface module could be used to allow an Infra-Red link to vending machine controllers that do not have the provision for a direct connection.

The printer monitor input 26 is a three (3) or four (4) wire unidirectional interface that is used by a small number of vending machines to directly print out audit information onto a paper tape. The printer interface is monitored by the AMC and the text output is translated into appropriate DEX data elements. A control signal (CTS) is provided from the AMC to indicate BUSY if required. XON/XOFF software flow control is also provided. Via configuration, the AMC is able to support multiple standard printer baud rates and message structures.

The MDB interface 28 is the current industry standard for virtually all electronic vending machines. It is a unique, three (3) wire signal interface (five wire including power/ground) used by coin mechanisms and/or bill validators and/or card readers and other devices to communicate with vending machines. The interface is primarily used in the US, Europe, and other Western countries. It is based on a specialized bi-directional, 9600 baud coded message structure.

The AMC is able to operate in two modes when connected to the MDB interface 28. In one mode, it monitors all MDB message traffic. In this mode, the AMC is able to interpret the messages and collect virtually all credit and vend transactions and translate them into appropriate DEX data elements. In the second mode, the AMC is configured to act as an active audit device when connected to the MDB interface 29 to which VMCs can directly transmit audit data. Currently there is an Audit Device (address 18H) defined in the NAMA MDB/ICP specification. In addition, a proprietary MDB based audit device has been produced for a specific company. It resides on the MDB bus as address 18H and new controllers for that company support it. In addition to dedicated messages to the proprietary audit device, the new MDB File Transport Layer (FTL) is also implemented which provides for high level, bi-directional data transfers across the MDB bus to the VMC or other peripherals that support FTL.

The Executive interface 30 is a four (4) wire current loop interface used by coin mechanisms and card readers to communicate with vending machines. The interface is primarily used in Europe and other Western countries outside the US. It is based on a specialized bi-directional, 9600 baud coded message structure.

The AMC 10 is able to operate in two modes when connected to the Executive interface. In one mode, it monitors the Executive message traffic. In this mode, the AMC is able to interpret the messages and collect virtually all credit and vend transactions and translate them into appropriate DEX data elements. In the second mode, the AMC is configured to act as an active audit device on the Executive interface 32. Various coin mechanisms and/or card readers recognize the existence of an audit module and transmit transaction information. The AMC receives the Executive messages and translates them into appropriate DEX data elements.

A pair of One-Wire interfaces (actually 2 wires including ground) are unique interfaces used to access devices manufactured by the DALLAS Semiconductor Company. One interface 34 is used to read/store information to a Touch Memory for quick setup and/or time and date. The second interface 36 is used to monitor the temperature of the machine to detect machine malfunctions which could result in potential product spoilage. A limit (alarm) condition can be set to be logged as an event.

The Micromech (MC5000) interface 38 is a twelve (12) or fifteen (15) wire interface used by coin mechanisms to communicate with vending machines. The interface 38 is primarily used in the US and is based on a specialized uni-directional, 600 baud coded message structure with additional bi-directional control signals. Although the coin mechanisms can operate either from 120 VAC (12 pin) or 24 VAC (15 pin), the AMC monitors only the low voltage (5VDC) signals used for communications and control.

The Pulse/Serial Bill Validator interface 40 is a multi-wire credit pulse type interface or specialized unidirectional, 600 baud coded message structure with additional bi-directional control signals that is monitored to determine the cash amount of inserted bills. Typically, it will be used in conjunction with the Micromech interface to accumulate a complete accounting of the cash transactions.

The ACD interface 42 is a three (3) wire interface used by coin mechanisms to transmit cash information. It is based on a specialized unidirectional, 1200 baud coded message structure sent as three double byte packets (doublets). The AMC monitors the ACD messages.

To allow the AMC to detect and/or force machine functions, the controller incorporates four (4) general purpose inputs and two (2) general purpose "open collector" outputs 44. The inputs are typically set to be logged as machine events. Inputs three and four can also be used with an optional Optical Isolator Module to monitor either (or both) of a cash counter and a credit line.

Regarding the cash counter, the coin mechanism transmits a credit pulse to indicate the cash amount of vends. Sent after a vend, each pulse translates into a monetary unit (one pulse equals 5 cents). Concerning the credit line, the mechanism transmits an actual vend relay output which is used to initiate a vend. Each pulse translates into a single vend count.

The LMM/MMM and DLMM/DMMM interface 46 is used to connect to a Linear Motor Monitor (LMM) or to a Matrix Motor Monitor (MMM), or to a Direct Linear Motor Monitor (DLMM), or to a Direct Matrix Motor Monitor (DMMM), which are individual AMC sub-modules that are used to monitor vending machine motors and various other vending machine interfaces. The LMM and MMM are individual AMC sub-modules which are used to monitor vending machine motors and incorporate a microprocessor which scans motor inputs and sends the information to the AMC for further processing. The LMM and MMM can be used if the AMC does not monitor the Micromech (MC5000) or Pulse Bill Validator interfaces directly. The LMM is designed for higher voltage (120 VAC) linear motors and the MMM is designed for lower voltage (24 VDC) matrixed motors. A European version of the LMM is designed for 240 VAC linear motors. The AMC interfaces with both via a serial, 1200 baud, four (4) wire, optically isolated bus. Information received from the devices is translated into appropriate DEX data elements by the AMC.

The Direct Linear Motor Monitor (DLMM) and the Direct Matrix Motor Monitor (DMMM) are individual AMC sub-modules which are used to monitor vending machine motors directly from the AMC. These devices can be used if the AMC directly monitors the Micromech (MC5000) or Pulse Bill Validator interfaces. The DLMM is designed for higher voltage (120 VAC) linear motors and the DMMM is designed for lower voltage (24 VDC) matrixed motors. A European version of the DLMM may be designed for 240 VAC linear motors. The AMC interfaces directly with both via a "bit banged", three (3) wire signal bus. Information received from the monitors is translated into appropriate DEX data elements by the AMC.

A momentary contact User Button 48 is provided to allow a route or service person to manually provide an input to the AMC. An example would be a "Fill Button" which would be pressed when the machine is completely filled. This prompts the AMC firmware to load column product counters with predetermined numbers to be used to determine a Sold Out condition.

In an implementation; the Audit Monitor Controller 10 transmits its monitored and collected data via the industry standard EVA-DTS DEX/UCS protocol. A 9600 baud, three (3) wire DEX/UCS interface 50 is based on the 0 to 5VDC RS232C signals as defined in the EVA-DTS. Although the AMC normally takes the role as a SLAVE during the first DEX handshake, it can be optionally be configured to act as a MASTER if required for older data carriers. This allows the data carrier to be the MASTER and determine the direction of data transfer. All transferred data adheres to the vending industry DEX data element format. The DEX/USC interface 50 is also able to be used to load configuration data into the AMC.

Figure 2:
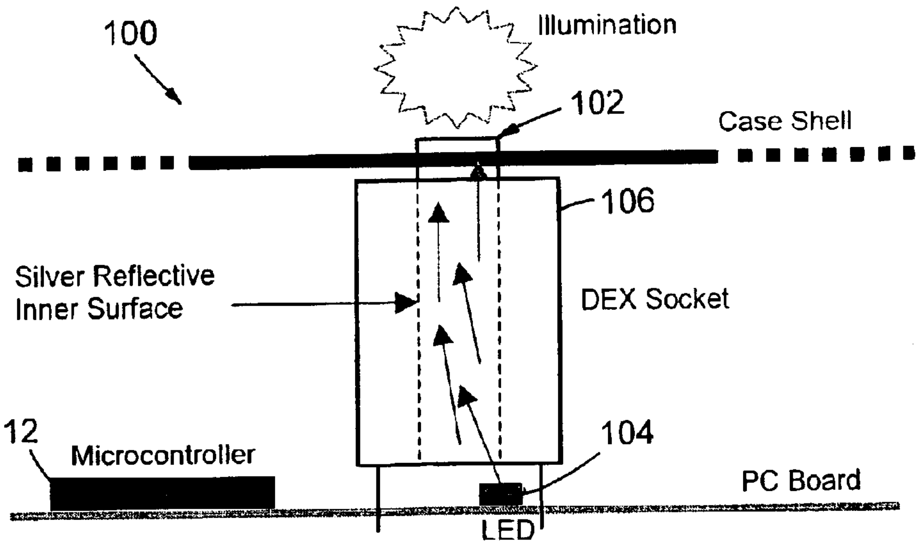
FIG. 2 is a simplified schematic diagram illustrating an illuminated DEX socket.

FIG. 2 is a simplified schematic diagram 100 illustrating an illuminated DEX socket 102. To provide information to the service man and/or route man, an LED 104 is provided to illuminate the DEX port socket 102. This is a significant benefit in guiding the route man as to where to insert the DEX connector plug, especially in a dark vending machine. It also provides an easily visible way of seeing that the unit is operating normally. The AMC 10 uses the LED as a "heartbeat", whereby when it is operating normally, it pulses at an approximate half-second rate. In this implementation; an LED 104 is located on the AMC printed circuit board near the bottom of the DEX socket 106. This configuration takes advantage of the socket being open at the bottom, the interior of the socket being reflective metal, and the LED may be a flat SMD part which can fit under the socket.

The LED serves as an indicator for the microcontroller. When the microcontroller is operating normally, the LED is pulsing ON and OFF at approximately a 50% duty cycle every second.

The pulsating light emitted from the LED is reflected by the inner silver surface of the DEX socket. The resultant pulsating glow from the top of the socket, where it protrudes through the case shell, indicates to the machine operator, service technician, or route person whether or not the Retrofit Audit System is operating properly. In addition, the pulsating glow also guides the route person as to where to insert the DEX plug. This is especially useful in the typically dark conditions of vending machines.

The LED may also provide additional functionality. For example, when software is being loaded into system memory, the LED may flash at an increased rate that is easily distinguishable from the normal flash rate. Also in many situations where the system is not functioning properly, the LED may remain ON or OFF constantly. A constant LED ON situation may be representative of missing or corrupt memory while a constant LED OFF situation may be representative of hardware failure.

Referring again to FIG. 1, the Audit Monitor Controller 10 can transmit its monitored and collected data via the industry standard EVA-DTS Enhanced DDCMP (Optical) Protocol (EOP) interface 52. This protocol is a higher data transfer rate extension to the original 1200 & 2400 baud DDCMP based protocol existing in vending machines today. The physical optical medium (located on an external module) is derived from the IrDA interface used in the PC/PDA industry. The AMC is capable of 115.2K baud, the EOP maximum. All transferred data adheres to the vending industry DEX data element format (as defined in the EVA-DTS even though the protocol is DDCMP). The interface is also able to be used to load configuration data into the AMC.

The AMC may operate from several power sources 54. These may include a 24 VAC (50–60 Hz) vending machine power source, a 34 VDC MDB bus power source, a 24VAC (50–60 Hz) external transformer (including LMM/MMM), and a ACD Interface 11VDC power source (not shown).

Figure 3:
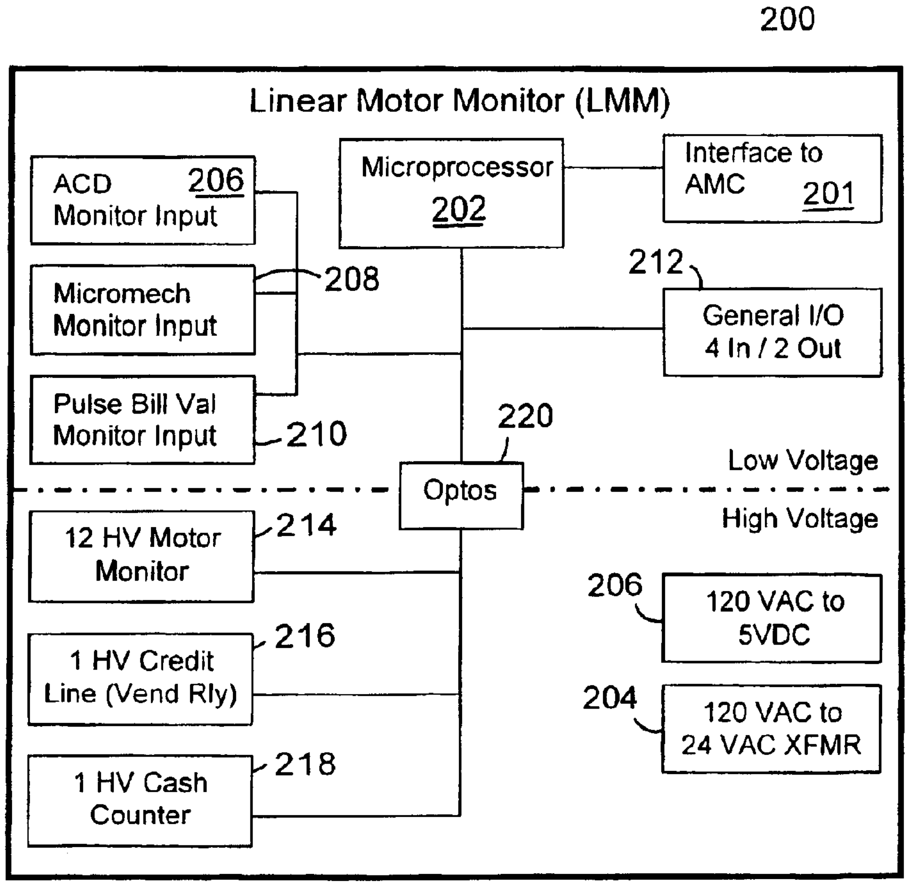
FIG. 3 is a simplified block diagram of a Linear Motor Monitor (LMM).
Figure 4:
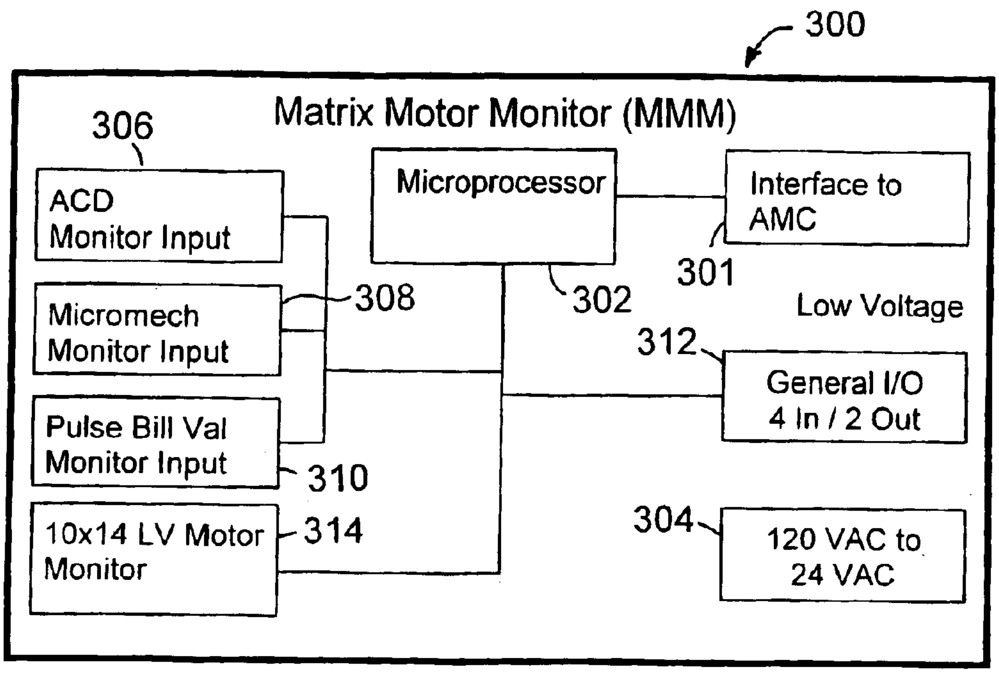
FIG. 4 is a simplified block diagram of a Matrix Motor Monitor (MMM).

FIG. 3 is a simplified block diagram of a Linear Motor Monitor (LMM) 200 which is a sub-module to the Audit Monitor Controller 10. FIG. 4 is a simplified block diagram of a Matrix Motor Monitor (MMM) 300 which is another sub-module to the AMC 10. The LMM and MMM are similar, microprocessor based sub-modules that interface to the AMC via a dedicated serial interface. The LMM 200 connects to high voltage (120 VAC) directly driven motors, whereas the MMM connects to low voltage (24VDC) motors driven in a row/column matrix.

In the implementation shown in FIG. 3, the LMM incorporates a microcontroller 202 to monitor the high voltage (120 VAC) linear motors and other vending machine interfaces listed in the Common Motor Monitor Vending Interfaces described below. Examples of Common Motor Monitor Vending Interfaces include, but are not limited to, Credit Line (Vend Relay) interface 216, the Cash Counter interface 218, the Accountability Credit Display (ACD) interface 206, the Micromech monitor input 208, and the Pulse Bill Validator monitor input 210. All information is collected by the microcontroller 202 and is sent to the AMC 10 via AMC interface 201 for further interpretation and processing. Unique features of the LMM 200 include the ability to detect the state of up to twelve (12) high voltage (120 VAC) motors with a 12 HV Motor Monitor 214. In addition, one (1) high voltage (120 VAC) Credit Line (Vend Relay) input and/or one (1) high voltage (120 VAC) Cash Counter input is provided as described below.

The Credit Line (Vend Relay) interface 216 is a two wire pulse type interface that is monitored by the AMC to determine the number of vends performed by a vending machine. It is typically used with single price coin mechanisms with each pulse translating into a single vend. The LMM/MMM monitors the Credit Line pulses and send the counts to the AMC.

The Cash Counter interface 218 is a two wire, 120VAC credit pulse type interface that is monitored by the LMM. Normally used with single price coin mechanisms, each pulse typically translates into a monetary unit; i.e., one pulse equals 5 cents. The LMM monitors the Cash Counter pulses and send the counts to the AMC.

The LMM connects to 120 VAC and contains a 24 VAC transformer 204 which has a two wire output to supply power to the AMC. The LMM also contains an optically isolated portion of electronics 220 which operate on a direct 120VAC derived 5VDC power supply 206. A European version of the LMM is designed for 240 VAC operation.

FIG. 4 illustrates the Matrix Motor Monitor sub-module 300 to the Audit Monitor Controller. The MMM incorporates a small microcontroller 302 to monitor the low voltage (24 VDC) matrixed motors and other vending machine interfaces listed below regarding the Common Motor Monitor Vending Interfaces. All information is collected by the microcontroller and is sent to the AMC via an AMC interface 301 for further interpretation and processing. One unique feature of the MMM is its ability to detect the state of up to 144 (10 row×14 column) low voltage (24 VDC) motors via a LV Motor Monitor 314.

The MMM connects to 120 VAC and contains a 24 VAC transformer 304 which has a two wire output to supply power to the AMC. The MMM includes an ACD monitor input 306, a micromech monitor input 308, and a pulse bill validator monitor input 310. The MMM also contains an optically isolated portion of electronics which operate on a direct 120 VAC derived 5 VDC power supply. A European version of the LMM may be designed for 240 VAC operation.

As stated for both the LMM and the MMM descriptions above, the two sub-modules also contain electronics to monitor various vending machine interfaces. The microcontroller in the LMM and MMM detects and buffers the information collected on the vending interfaces. This information is passed onto the AMC micro-processor for further higher level interpretation and translation into DEX data elements. The following paragraphs describe the vending interfaces monitored.

The Accountability and Credit Display (ACD) interface (206 and 306) is a three (3) wire interface used by coin mechanisms to transmit cash information. It is based on a specialized unidirectional, 1200 baud coded message structure sent as three double byte packets (doublets). The LMM and MMM monitor the ACD messages and parse the three doublets into two byte packets to send to the AMC.

The Micromech (MC5000) interface (208 and 308) is a twelve (12) or fifteen (15) wire interface used by coin mechanisms to communicate with vending machines. The interface is primarily used in the US and is based on a specialized uni-directional, 600 baud coded message structure with additional bi-directional control signals. Although the coin mechanisms can operate either from 120 VAC (12 pin) or 24 VAC (15 pin), the LMM and MMM monitor only the low voltage (5VDC) signals used for communications and control. The LMM and MMM monitor the Micromech messages and parse the information into packets to send to the AMC.

The Pulse/Serial Bill Validator interface (210 and 310) is a multi-wire credit pulse type interface or specialized uni-directional, 600 baud coded message structure with additional bi-directional control signals that are monitored to determine the cash amount of inserted bills. Typically, it is used in conjunction with the Micromech interface to accumulate a complete accounting of the cast transactions. The LMM and MMM monitor the Bill Validator pulses or serial messages and send the credit values to the AMC.

To allow the AMC to detect and/or force machine functions, the LMM and MMM incorporate four (4) general purpose inputs and two (2) general purpose "open collector" outputs (212, 312) as shown in FIGS. 3 and 4.

Figure 5:
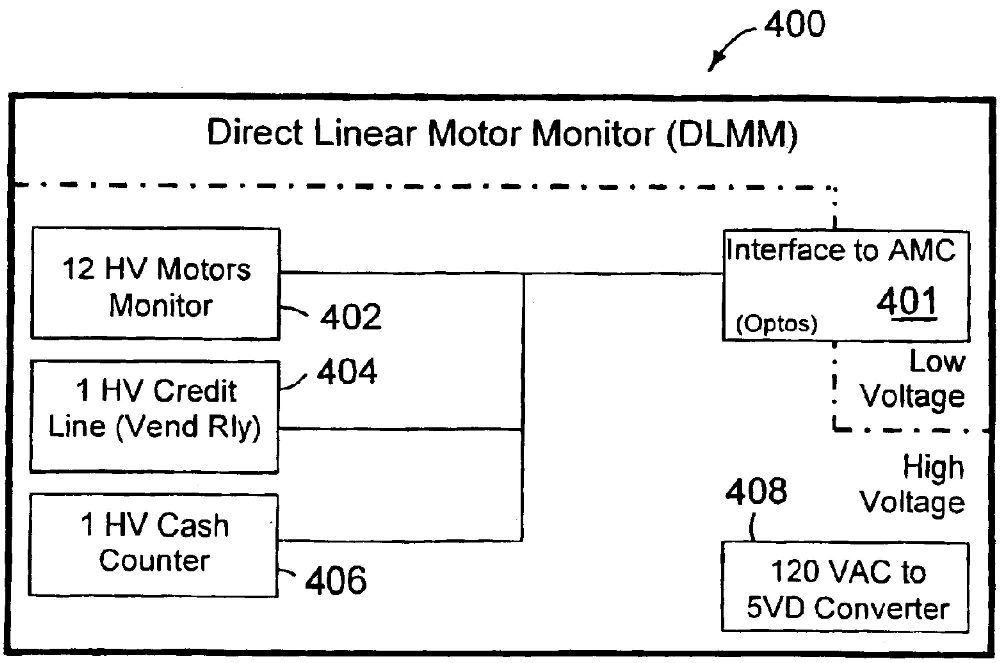
FIG. 5 is a simplified block diagram of a Direct Linear Motor Monitor (DLMM).

FIG. 5 depicts the Direct Linear Motor Monitor (DLMM) sub-module 400, which contains an optically isolated interface 401 to the Audit Monitor Controller. The DLMM connects to high voltage (120 VAC) directly driven motors, and incorporates shift registers which are directly controlled by the AMC 10. The shift registers detect the state of up to twelve (12) high voltage (120 VAC) motors, represented by monitor 402, and the DLMM also includes one (1) high voltage (120 VAC) Credit Line (Vend Relay) input 404, and one (1) high voltage (120 VAC) Cash Counter input 406. The DLMM operates on a direct 120VAC derived 5 VDC power supply 408. A European version of the DLMM is designed for 240 VAC operation. As an option, two DLMMs can be daisy chained together for additional motor monitoring. The AMC is able to automatically detect how many DLMMs are connected by reading information provided in the shifted data stream.

The DLMM incorporates an AC signal detection synchronization method to allow the AMC 10 to detect when the 120 VAC motor signals, Credit Line (Vend Relay), and Cash Counter are active with respect to the 120 VAC line power.

Figure 6:
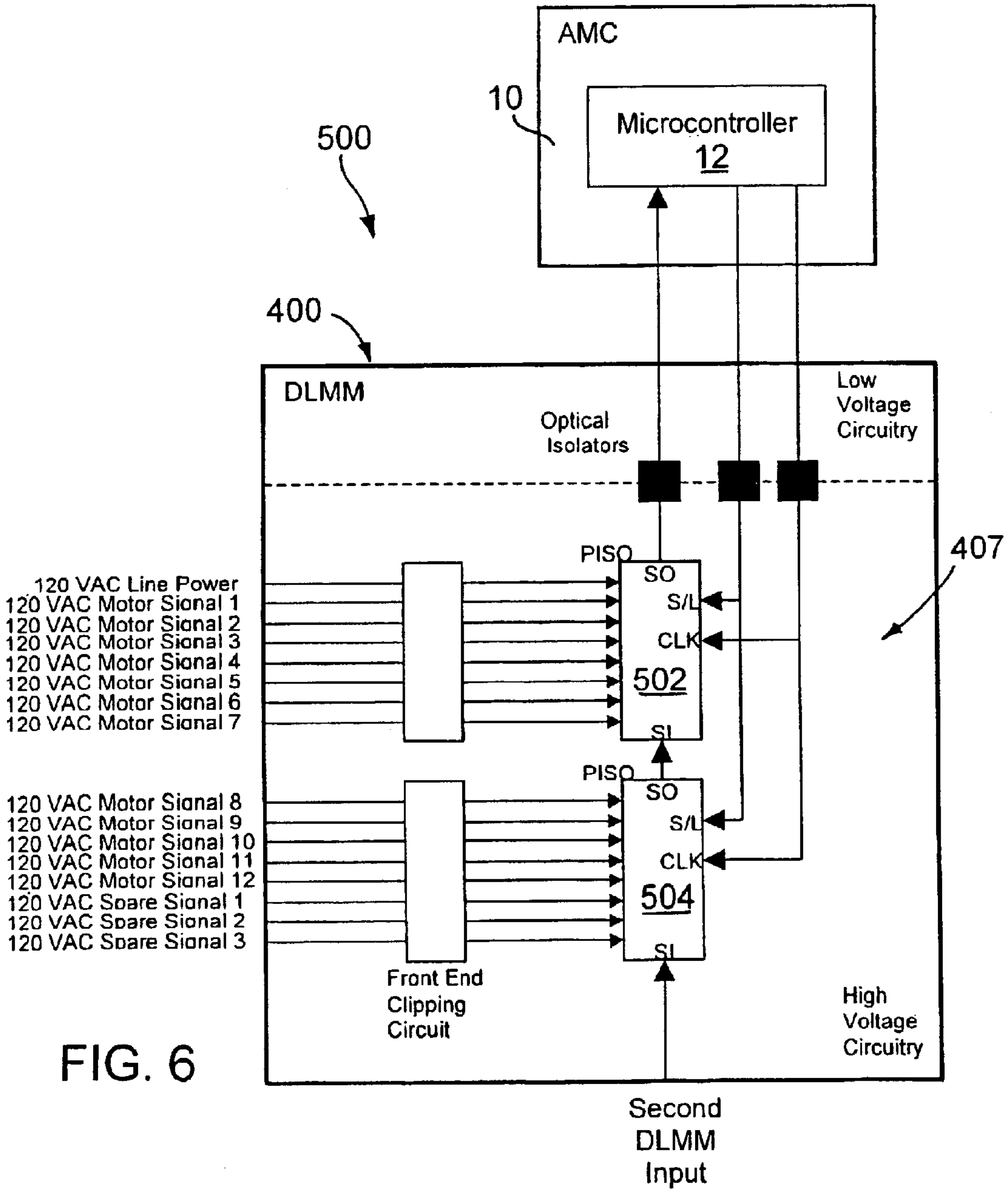
FIG. 6 is a block diagram illustrating the interface connection between the DLMM of FIG. 5 and the AMC.

FIG. 6 is a block diagram 500 illustrating the interface between the AMC and DLMM. AMC interface 401 is a unidirectional, synchronous serial interface based on Parallel In Serial Out shift registers (PISO's) 502 and 504 that are controlled by the microcontroller 12 in the AMC. The front end circuitry 407 in the DLMM 400 clips the 60 cycle signals which makes it impossible for the AMC microcontroller firmware to tell the difference between a motor signal not being active as opposed to the signal being active, but being in the part of the 60 cycle that is clipped (therefore, not "visible"). Since the AMC's microcontroller 12 is multiplexing numerous tasks, it is not dedicated to continuously reading in the DLMM's signals. This, coupled with the shifted serial data, make it necessary to detect when the AC signals were in a valid state.

A method implemented to provide this information used an additional input on the parallel-to-serial shift register to be able to detect the actual 120 VAC line power in addition to the normally monitored inputs. In essence, when the firmware reads the DLMM data, the software checks the 120 VAC line power bit to see if it's high. If so, it then checks the rest of the motor inputs to see if any of them are active. The judicial location of the 120 VAC line power input on the shift register's least significant bit (LSB) also provides a feature whereby the AMC can detect the state of the line power by toggling a single signal (LOAD) to the shift register.

Figure 7:
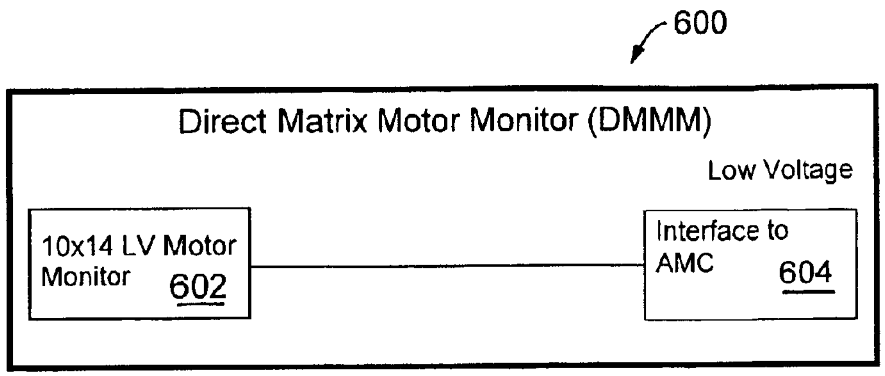
FIG. 7 is a simplified block diagram of a Direct Matrix Motor Monitor (DMMM).
Figure 8:
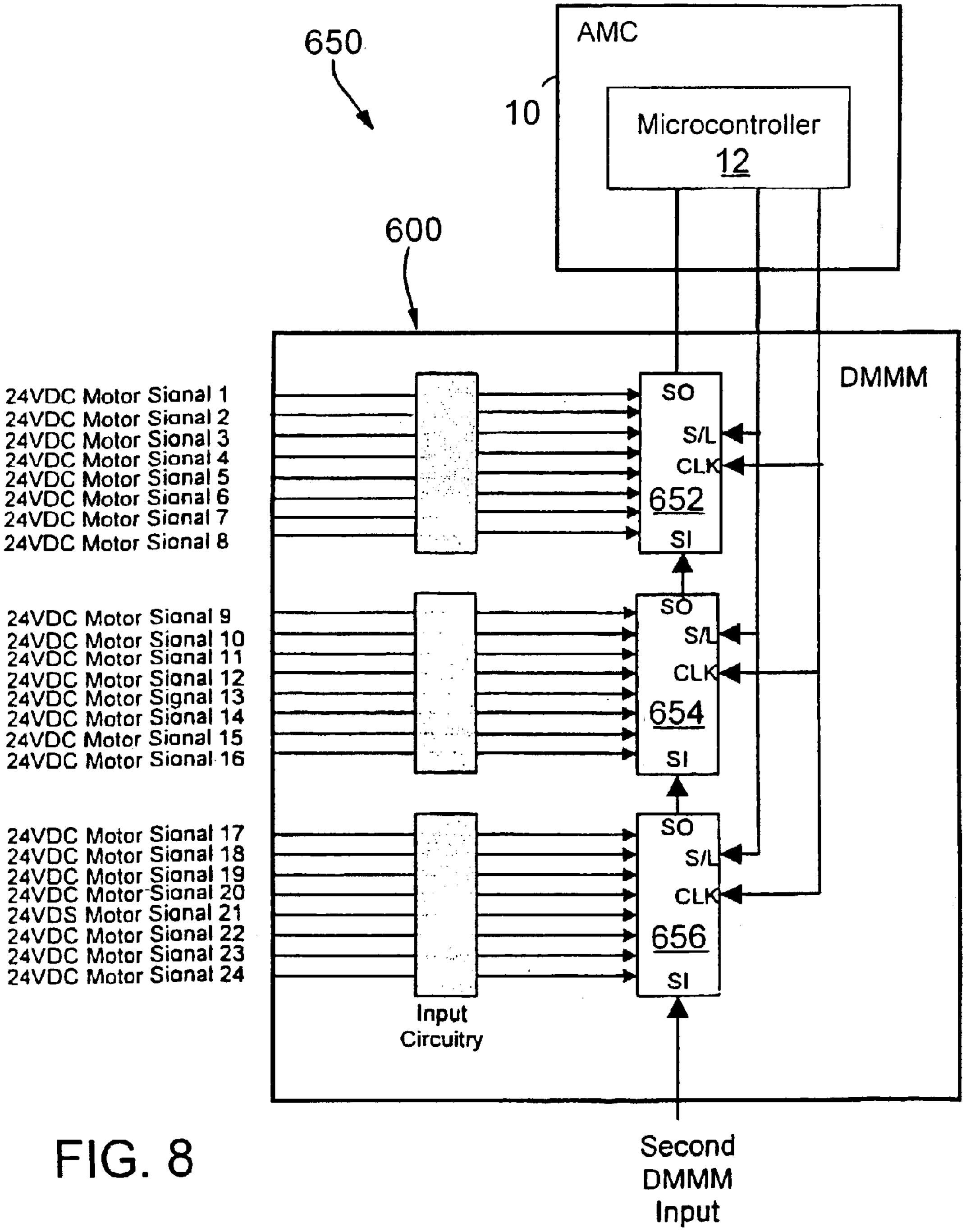
FIG. 8 is a block diagram illustrating the interface connection between the DMMM of FIG. 7 and the AMC.

The Direct Matrix Motor Monitor (DMMM) 600, illustrated in FIG. 7, is a sub-module to the Audit Monitor Controller that is similar to the Direct Linear Motor Monitor "DLMM" 400 of FIG. 5. FIG. 8 is a simplified block diagram illustrating the interface between the AMC and the DMMM. Both the DMMM and DLMM interface directly to the AMC 10 via a "bit banged" interface. The DMMM connects to low voltage (24VDC) motors typically driven in a row/column matrix. The DMMM incorporates shift registers (652, 654 and 656) which are directly controlled by the AMC. The shift registers detect the state of up to 144 (10 row×14 column) low voltage (24 VDC) motors and are connected to an AMC interface 604. The DMMM operates on power supplied by the AMC. As an option, two DMMMs can be daisy chained together for additional motor monitoring. The AMC is able to automatically detect how many DMMMs are connected by reading information provided in the shifted data stream.

Figure 9:
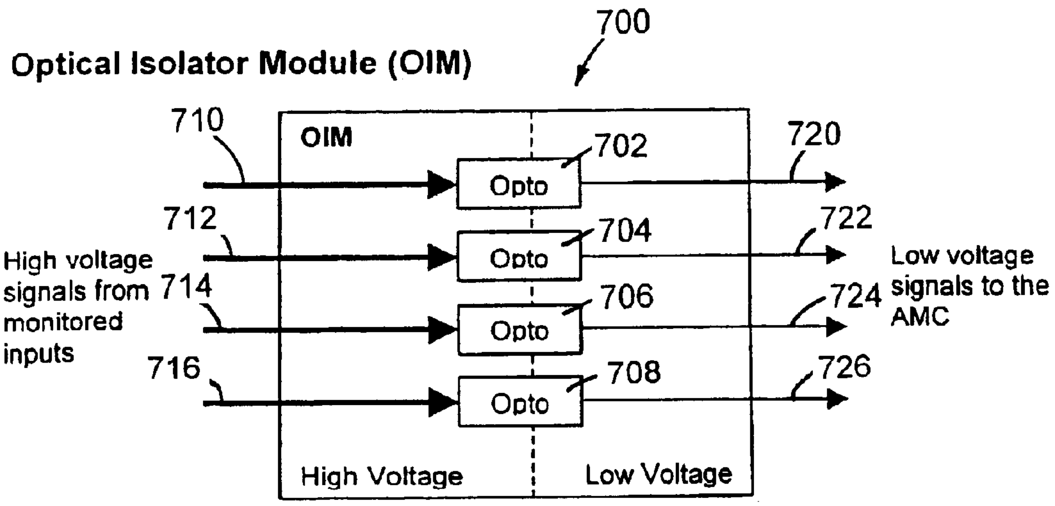
FIG. 9 is a simplified block diagram of an Optical Isolator Module (OIM).

In order to monitor the 120VAC high voltage Cash Counter, Credit Line, and bill validator Enable & Inhibit signals, the AMC 10 requires these to be buffered by optical isolators. FIG. 9 illustrates an Optical Isolator Module (OIM) 700 which contains four (4) general purpose optical isolators 702, 704, 706 and 708 that can accept the high voltage signals from monitored inputs 710, 712, 714, and 716 and convert these into the lower voltage signals 720, 722, 724, 726 required by the AMC. A European version of the OIM is designed for 240 VAC operation.

Figure 10:
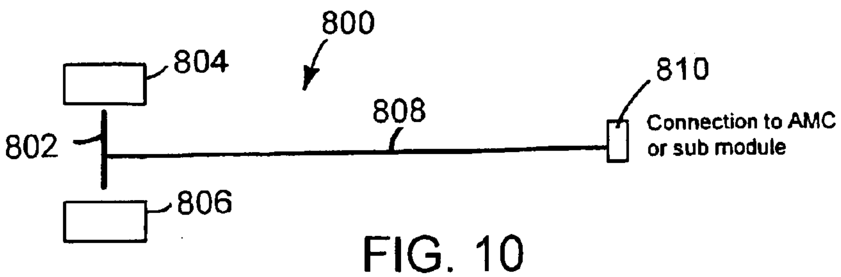
FIG. 10 illustrates an implementation of a cable connection between a vending machine controller or credit device and the AMC of FIG. 1 or a sub-module of FIGS. 3, 4, 5 or 7.

FIG. 10 illustrates a cabling configuration 800. In particular, numerous cables are implemented in the Retrofit Audit System which allow the monitoring of the various vending machine interfaces. These cables are designed so that the normal vending machine signals are not only passed through, but also "tapped into" in order for the AMC and its sub-modules to detect the state of the signals as shown in FIG. 8. For example, shown are a cable 802 connecting a vending machine controller 804 to a credit device 806. A cable 808 taps into line 802 and includes a connection 810 to the AMC or to a sub-module which have been described above. Other configuration are possible wherein the AMC or a sub-module is connected to another device or devices within a vending machine.

The Retrofit Audit System converts all the data that it monitors into industry standard data elements. The particulars are defined in the EVA-DTS specification. One of the prime features of the RAS is its ability to merge the various types of data from the various types of interfaces The AMC 10 must be configured to match the Retrofit Audit System (RAS) to the target vending machine. This programming is performed via unique commands as well as DEX/UCS data elements as configuration messages utilizing the MC5 group of standard EVA-DTS data elements which permit unique device dependent data to be transferred.

In an effort to prevent normal DEX/UCS usage from configuring the AMC, the system implements a secondary security password to enable this feature. After the normal DEX/UCS First & Second Handshake and SD1 password, in an implementation the following command is sent and is followed by an asterisk (*) and a 10 digit number.

MEI*SECURITY*##########

Following receipt of the proper SD1 and SECURITY password, the AMC allows the MC5 type configuration messages, special commands, or a configuration read. A configuration window is "opened" which remains so for approximately 2 minutes. During this time, multiple DEX session MC5 type configuration element strings can be transferred. Each time one is transferred the window will remain open for an additional 2 minutes. If a specialized command is received the window will close immediately after processing the command.

If a DEX read is performed during the "window", all AMC configuration parameters will be read back using the equivalent MA5 fields. These will be returned in lieu of the normal DEX audit records. The window will close immediately after the transmission of the data.

The following paragraphs provide three (3) examples of data elements groups (MACHINE, COIN, and TIME) that are implemented in the AMC for RAS configuration purposes. Note that many other types of configuration/setup parameters are able to be sent to the RAS. Note also that these are in addition to the general configuration elements that can be sent to the AMC to configure non operational parameters, i.e., Asset Numbers. These elements are defined in the industry EVA-DTS standard.

In the information below, AN indicates alphanumeric, N0 indicates integer numbers, Nc indicates cash based numbers, TM indicates time, and DT indicates date. The ##/## symbol indicates the minimum/maximum length of the element which have been targeted to the specifics of the RAS and have been increased where necessary to transmit the required data. The M indicates the field is mandatory and will always be written to the AMC. The O indicates the field is optional for writing, but must be sent back when reading.

Generally, the means to configure the AMC is performed by using the MC5 group of machine specific elements which are defined below. Note that if an element or block of elements is not sent, the previous element setting(s) is preserved.

1. MACHINE Data Elements (Configure)

If the MC501 Block Number indicates Machine, the following data elements are used to configure the AMC with various machine related data elements.

| | | | |
|---|---|---|---|
| MC502 Manufacturer/Model | O | AN | 01/20 |

This element identifies the actual manufacturer and/or model number of the vending machine. A three character manufacture code is used as specified in Appendix B of the EVA-DTS. If undefined, the element can either be skipped or sent as XXX. Examples would be:

| | |
|---|---|
| API | Automatic Products International |
| CNV | Crane National Vendors |
| EZV | Electrolux Zanussi Vending |
| WIT | Wittenborg A/S |
| XXX | Undefined |

| | | | |
|---|---|---|---|
| MC503 Motor Drive | M | AN | 03/06 |

This element identifies the type of motor drive used in the vending machine. A three character code is used. Defined drives would be:

| | |
|---|---|
| NONE | No motor monitoring |
| LIN or LINEAR | Linear (DLMM used) |
| MTX or MAT or MATRIX | Matrix (DMMM used) |

| | | | |
|---|---|---|---|
| MC504 Product Sale Information | M | AN | 04/07 |

This element determines whether the PA501 & PA502 elements are used to indicate the Sold Out Date/Time or Most Recent Sale Date/Time. A four or seven character code is used per below:

| | |
|---|---|
| SOLDOUT | Sold Out Date/Time |
| SALE | Most Recent Sale Date/Time |

2. COIN Data Elements (Configure)

If the MC501 Block Number indicates COIN, the following data elements are used to configure the AMC with the various coin mechanism related data elements.

| | | | |
|---|---|---|---|
| MC502 Manufacturer/Model | O | AN | 01/20 |

This element identifies the actual manufacturer and/or model number of the coin mechanism. A three character manufacturer code is used as specified in Appendix B of the EVA-DTS. If undefined, the element can either be skipped or sent as XXX. Examples would be:

| | |
|---|---|
| AZK | Azkoyen Comercial |
| CAI | Coin Acceptors International |
| MEI | Mars Electronics International |
| NRI | National Regectors, Inc. |
| XXX | Undefined |

| | | | |
|---|---|---|---|
| MC503 Coin Mechanism Interface | M | AN | 03/06 |

This element identifies the type of coin mechanism interface used in the vending machine. A three/four/five character code is used. This element must be configured and cannot be skipped or sent as XXX. Defined coin mechanism interfaces would be:

| | |
|---|---|
| NONE | No Coin Mechanism |
| 1PR | Single Price |
| 4PR | Four Price |
| 10PR | Ten Price |
| MC5000 * | MC 5000 (117 VAC or 24 VAC) |
| MDB | Multi-Drop Bus |
| EXEC | Executive |

* or 5000

| | | | |
|---|---|---|---|
| MC504 Cash Counter Scaling Factor | M | N0 | 01/04 |

This element identifies the scaling factor that should be used when monitoring the cash counter output pulses of a 1/4/10 price coin mech. This element must be configured and cannot be skipped or sent as X if a 1PR, 4PR, or 10PR coin mech is selected in element MC503.

3. TIME Data Elements (Configure)

Although the time and date can be set using standard DEX/UCS configuration commands, the AMC can optionally be sent a special MC5 TIME command that is similar to previously designed control boards. This allows the existing MEIDEX program to be used without modification.

If the MC501 Block Number indicates TIME, the following data elements are used to configure the AMC's real time clock.

| | | | |
|---|---|---|---|
| MC502 Unused | M | AN | 01/01 |

This element is unused in the AMC and regardless of what is sent, the AMC will ignore it.

| | | | |
|---|---|---|---|
| MC503 Date | M | DT | 06/08 |

This element allows the setting of the date using the format (CC)YYMMDD. Valid years would be (20)00–(20)99, valid months would be 01–12, and valid days would be 01–31. The century digits are optional.

| (CC)YYMMDD | Date specified by: |
|---|---|
| CC | century 20 (2000) |
| YY | years from 00 (2000)–99 (2099) |
| MM | months from 01 (January)–12 (December) |
| DD | days from 01–31 |

| | | | |
|---|---|---|---|
| MC504 Time | M | TM | 04/04 |

This element allows the setting of the time using the 24 hour format HHMM. Valid hours would be 00–23 and valid minutes would be 00–59.

| HHMM | Time specified by: |
|---|---|
| HH | hours from 00–23 |
| MM | minutes from 00–59 |

| | | | |
|---|---|---|---|
| MC505 Daylight Savings Mode | M | AN | 01/03 |

This element allows the setting of daylight savings. The parameters are listed below:

| | |
|---|---|
| OFF or OF | No daylight savings mode |
| NA or USA | North American rules (see IC504) |
| EU or EUR | European rules (see IC504) |
| AU or AUS | Australian rules (see IC504) |

A number of embodiments of the invention have been described. Nevertheless, it will be understood that various modifications may be made without departing from the spirit and scope of the invention, and the other implementations are within the scope of the following claims.

What is claimed is:

1. A retrofit audit system comprising:

a master module containing a microprocessor capable of reading information directly from a target vending machine control system or operational device, the master module including at least one communication port; and a plurality of sub-modules connected to the at least one communication port of the master module, the sub-modules capable of detecting additional information from the target vending machine or operational device, wherein the microprocessor is configured for the target vending machine via specialized commands and configuration messages.

2. The apparatus of claim 1 where at least one sub-module contains a microprocessor.

3. The apparatus according to claim 1 wherein the microprocessor is able to read DEX/UCS based audit data from the target vending machine control system or operational device and combine that information with additional information directly monitored from the target vending machine.

4. The apparatus according to claim 1 wherein the microprocessor is able to correlate and transform the information directly monitored from the target vending machine into a current vending industry standard data format.

5. The apparatus according to claim 1 wherein the microprocessor is able to transmit the collected and transformed data via current vending industry standard protocols and data formats.

6. The apparatus according to claim 1 wherein the microprocessor is able to read DDCMP based audit data from the target vending machine control system or operational device and combine that information with additional information directly monitored from the target vending machine.

7. The apparatus according to claim 1 wherein the microprocessor is able to read Printer based audit data from the target vending machine control system or operational device and combine that information with additional information directly monitored from the target vending machine.

8. The apparatus according to claims 6 or 7 wherein the microprocessor is able to correlate and transform the retrieved DDCMP and printer based audit data from the target vending machine control system or operational device into the current vending industry standard data format.

9. The apparatus of claim 1, wherein the sub-modules include at least one of a linear motor monitor, a matrix motor monitor, a direct linear motor monitor and a direct matrix motor monitor.

10. The apparatus of claim 9, wherein the direct linear motor monitor and the direct matrix motor monitor include shift registers, and wherein at least two direct linear motor monitors and at least two direct matrix motor monitors can be daisy chained together.

11. The apparatus of claim 1 wherein the microprocessor is configured for the target vending machine based on its receipt of the specialized commands and configuration.

12. A retrofit audit system comprising:

a master module containing a microprocessor capable of reading information directly from a target vending machine control system or operational device, the master module including at least one communication port;

a plurality of sub-modules connected to the at least one communication port of the master module, the sub-modules capable of detecting additional information from the target vending machine or operational device; and an illuminated DEX/UCS audit port socket.

13. A retrofit audit system comprising:

a master module containing a microprocessor capable of reading information directly from a target vending machine control system or operational device, the master module including at least one communication port;

a plurality of sub-modules connected to the at least one communication port of the master module, the sub-modules capable of detecting additional information from the target vending machine or operational device; and circuitry in at least one sub-module to detect when monitored AC signals are in the portion of the cycle when they are valid.

14. The apparatus of claim 13 wherein the monitored AC signals include at least one of motor signals, credit signals and cash counter signals.

15. An audit system comprising:

an audit monitor controller containing a microprocessor and a plurality of input interface components operable to read information from at least one of a vending machine control system and an operational device, and including a plurality of output components; and at least one motor sub-module coupled to the audit monitor controller for monitoring vending machine motors, wherein the microprocessor is configured for the target vending machine via specialized commands and configuration messages.

16. The apparatus of claim 15 wherein the motor sub-module is at least one of a linear motor monitor and a matrix motor monitor.

17. The apparatus of claim 15 wherein the microprocessor correlates and transforms data from a vending machine into vending machine industry standard data format.

18. The apparatus of claim 15 wherein the microprocessor transmits data collected from a vending machine via vending industry standard protocols and data format.

19. The apparatus of claim 15 further comprising a user button to permit manual entry of information into the audit monitor controller.

20. The apparatus of claim 15 wherein the motor sub-module is at least one of a direct linear motor monitor and a direct matrix motor monitor.

21. The apparatus of claim 20 wherein the direct linear motor monitor and the direct matrix motor monitor includes shift registers, such that at least two direct linear motor monitors or at least two direct matrix motor monitors can be connected together in a daisy-chain configuration.

22. The apparatus of claim 15 wherein the audit module reads DDCMP based audit data and combines that information with additional information from a vending machine.

23. The apparatus of claim 22 wherein the microprocessor correlates and transforms the DDCMP audit data into vending industry standard data format.

24. The apparatus of claim 15 wherein the audit module reads printer-based audit data and combines that information with additional information from a vending machine.

25. The apparatus of claim 24 wherein the microprocessor correlates and transforms the printer-based audit data into vending industry standard data format.

26. The apparatus of claim 15 wherein the audit monitor controller includes an DEX/UCS interface for reading DEX/UCS based audit data and combines that information with additional information from a vending machine.

27. The apparatus of claim 26 wherein the DEX/UCS interface is a socket, and the audit module includes a light means that illuminates the socket.

28. An audit system comprising:

an audit monitor controller containing a microprocessor and a plurality of input interface components operable to read information from at least one of a vending machine control system and an operational device, and including a plurality of output components; and at least one motor sub-module coupled to the audit monitor controller for monitoring vending machine motors wherein the direct linear motor module includes circuitry to detect when monitored AC signals are valid.

29. The apparatus of claim 28 wherein the monitored AC signals include at least one of motor signals, credit signals and cash counter signals.

* * * * *